United States Patent [19]

Beckman et al.

[11] 4,340,965

[45] Jul. 20, 1982

[54] METHOD OF AND APPARATUS FOR DETECTING AND CIRCUMVENTING MALFUNCTIONS IN A CURRENT-LOOP COMMUNICATIONS SYSTEM

[75] Inventors: John T. Beckman, Granville; Paul S. Sanik, Westerville, both of Ohio

[73] Assignee: Owens-Corning Fiberglas Corporation, Toledo, Ohio

[21] Appl. No.: 199,176

[22] Filed: Oct. 22, 1980

[51] Int. Cl.³ .............................................. G06F 11/00
[52] U.S. Cl. ...................................... 371/62; 364/184; 364/473
[58] Field of Search ............................. 371/62, 22, 11; 364/184, 185, 473

[56] References Cited

U.S. PATENT DOCUMENTS

| 3,396,368 | 8/1968 | Lakhani | 371/62 |
| 3,587,044 | 6/1971 | Jenkins | 371/62 |
| 3,779,731 | 12/1973 | Pollock et al. | 364/184 |
| 3,810,120 | 5/1974 | Huettner et al. | 371/62 |
| 3,919,533 | 11/1975 | Einolf, Jr. et al. | 371/62 |

Primary Examiner—Charles E. Atkinson
Attorney, Agent, or Firm—Ronald C. Hudgens; Patrick P. Pacella; Paul T. Kashimba

[57] ABSTRACT

In a communication system having a communication line with a plurality of ports to which electronic means are attached for transmitting and receiving sets of signals, a method of and apparatus for detecting a malfunction in a first electronic means associated with a first port of the plurality of ports and preventing such first electronic means from interfering with the operation of the remainder of the system when such malfunction occurs. The sets of signals comprise combinations of a first signal having a first magnitude and a second signal having a second magnitude, which is different than the first magnitude. In addition, the sets have a predetermined total number of first and second signals and always start with a second signal and end with a first signal. Each of the electronic means is adapted to provide a first signal when it is not transmitting a set of signals. The subject invention comprises: starting the timing of a predetermined period of time when the first electronic means transmits a second signal after a first signal; resetting the time period when the first electronic means transmits a first signal; inhibiting the transmission of signals transmitted by the first electronic means to the communication line if the predetermined period of time has elapsed; and providing a first signal to the communication line if the predetermined period of time has elapsed.

10 Claims, 3 Drawing Figures

METHOD OF AND APPARATUS FOR DETECTING AND CIRCUMVENTING MALFUNCTIONS IN A CURRENT-LOOP COMMUNICATIONS SYSTEM

BACKGROUND OF THE INVENTION

This invention relates to multipoint communication systems employing current-loop communications and, more particularly, to a method of and apparatus for detecting and circumventing malfunctions in such systems.

Current-loop communication is utilized principally in point to point communications for computer peripherals and control systems. Normally, an active current source is used to provide an indication of an idle line; whereas, the beginning of transmission of data is indicated by a start bit of zero current. In multiport communications systems in which several devices share a common line, only one device may transmit data signals at a time. If the system employs one long communication line and several short distribution lines, there are two basic approaches to the distribution. One approach is the receive and retransmit daisy-chain technique wherein each unit receives the transmission and passes it to the next unit. The other approach uses a single unit to receive the signal and to distribute it to many short lines connected to the final units. The use of conventional current-loop circuits in either of these approaches creates a communications problem in that a break in one of the lines or failure of the device connected thereto presents a condition in which it appears that the device is actually transmitting data, since no current is provided to the receiver. This failure ties up the entire system because of the one-at-a-time transmitting requirement.

Therefore, it is an object of this invention to provide a reliable and accurate method of and apparatus for use in a multiport current-loop communications system for detecting whether a malfunction has occurred in a respective line or the device associated therewith and for disabling the faulty line to prevent interference with the remainder of the communications system.

SUMMARY OF THE INVENTION

In accordance with the present invention there is provided in a communication system having a communication line with a plurality of ports to which electronic means are attached for transmitting and receiving sets of signals, a method of detecting a malfunction in a first electronic means associated with a first port of the plurality of ports and preventing such first electronic means from interfering with the operation of the remainder of the system when such malfunction occurs. The sets of signals comprise combinations of a first signal having a first magnitude and a second signal having a second magnitude, which is different than the first magnitude. In addition, the sets have a predetermined total number of first and second signals and always start with a second signal and end with a first signal. Each of the electronic means is adapted to provide a first signal when it is not transmitting a set of signals. The subject method comprises the steps of: starting the timing of a predetermined period of time when the first electronic means transmits a second signal after a first signal; resetting the time period when the first electronic means transmits a first signal; inhibiting the transmission of signals transmitted by the first electronic means to the communication line if the predetermined period of time has elapsed; and providing a first signal to the communication line if the predetermined period of time has elapsed.

In addition, the invention provides an apparatus for use with a communication system having a communication line with a plurality of ports to which electronic means are attached for transmitting and receiving sets of signals. The subject apparatus is associated with a first port of the plurality of ports to detect a malfunction in a first electronic means associated with the first port and to prevent the first electronic means from interfering with the operation of the remainder of the system when such malfunction occurs. The sets of signals comprise combinations of a first signal having a first magnitude and second signal having a second magnitude, which is different than the first magnitude. The sets have a predetermined total number of first and second signals and always start with a second signal and end with a first signal. Each of the plurality of electronic means is adapted to provide a first signal when it is not transmitting a set of signals. The subject apparatus comprises: timing means for determining when a predetermined period of time has elapsed, such timing means being adapted to start its timing sequence when the first electronic means transmits a second signal after a first signal, such timing means being reset by the transmission of a first signal; and first means responsive to the timing means for providing the signals transmitted by the first electronic means to the communication line, the first means being adapted to provide only a first signal to the communication line if the predetermined period of time has elapsed.

Still further, the present invention provides a glass fiber producing apparatus comprising: means for producing molten glass fibers; a plurality of electronic means for controlling and monitoring the producing means, such electronic means being connected to a central communications means by a communication line and being adapted to transmit and receive sets of signals, and first means associated with a first electronic means of the plurality of electronic means for detecting a malfunction in the first electronic means and for preventing the first electronic means from interfering with the operation of the other electronic means when such malfunction occurs. The sets of signals comprise combinations of a first signal having a first magnitude and a second signal having a second magnitude, which is different than the first magnitude. In addition, the sets have a predetermined total number of first and second signals and always start with a second signal and end with a first signal. Each of the electronic means is adapted to provide a first signal when it is not transmitting a set of signals. The first means comprises: timing means for determining when a predetermined period of time has elapsed, such timing means being adapted to start its timing sequence when the first electronic means transmits a second signal after a first signal, and to be reset by the transmission of a first signal; and means responsive to the timing means for providing the signals transmitted by the first electronic means to the communication line, such means being adapted to provide only a first signal to the communication line if the predetermined period of time has elapsed. The term "electronic means," as used herein, is intended to include any device with communicating capability, such as computers, controllers, monitoring devices, data loggers, traffic directors and cathode-ray tubes.

The present invention prevents a single malfunctioning device from interrupting the communications of the remainder of the system. In essence, the subject invention utilizes a timing mechanism that is enabled to measure a predetermined period of time when an electronic device associated with the line being monitored by the subject invention transmits a low signal, such as the start bit, after a high signal. Such timer is reset by a high signal on the line, and thus may be reset by either a data bit that is high or the stop bit at the end of the character. The timing of the predetermined period of time is started each time a low signal is transmitted after a high signal. If the end of the predetermined time period is reached and the electronic device associated with the line is not providing a high signal, the subject invention assumes that a malfunction has occurred and forces the output to a high state, thus simulating an idle line. Under normal conditions, the stop bit would reset the timer before the predetermined period of time expires, thereby allowing communication to be carried on normally. If desired, but not preferred, the timing mechanism may be reset only by the stop bit at the end of the character.

The timing may be performed by a counter whose output goes high after a specific number of clock pulses have been counted. The counter starts counting when the data line goes low, i.e., the start bit has been transmitted by the device. The time required for the counter to time out is controlled by the clock rate; such time is chosen so that, for the particular number of bits in the data set and the particular baud rate used, the counter times out one-half bit later than the beginning of the stop bit. The arrival of a high on the data line, which may be either a data bit or the stop bit, resets the counter. If the counter times out due to a malfunction of the line or the device associated therewith, it sets a flip-flop latch that causes the output line to go to the high idle state, thereby allowing the rest of the communications network to function. Repairing of the fault and transmitting a high level signal which simulates a stop bit resets both the counter and the flip-flop so that data may be passed to the communications network.

Other objectives, advantages and applications of the present invention will be made apparent by the following detailed description of the preferred embodiments of the invention.

DETAILED DESCRIPTION OF THE PREFERRED EMBODIMENTS

The process for producing glass fibers, i.e., fibers made by melting particulate batch ingredients or minerals, including basalt and the like, described herein is illustrative of one type of process which incorporates the communication line control system of the present invention; however, other types of processes can also utilize the present invention. Therefore, the glass fiber producing system described herein should be interpreted as exemplary and not in a limiting sense.

Figure 1:
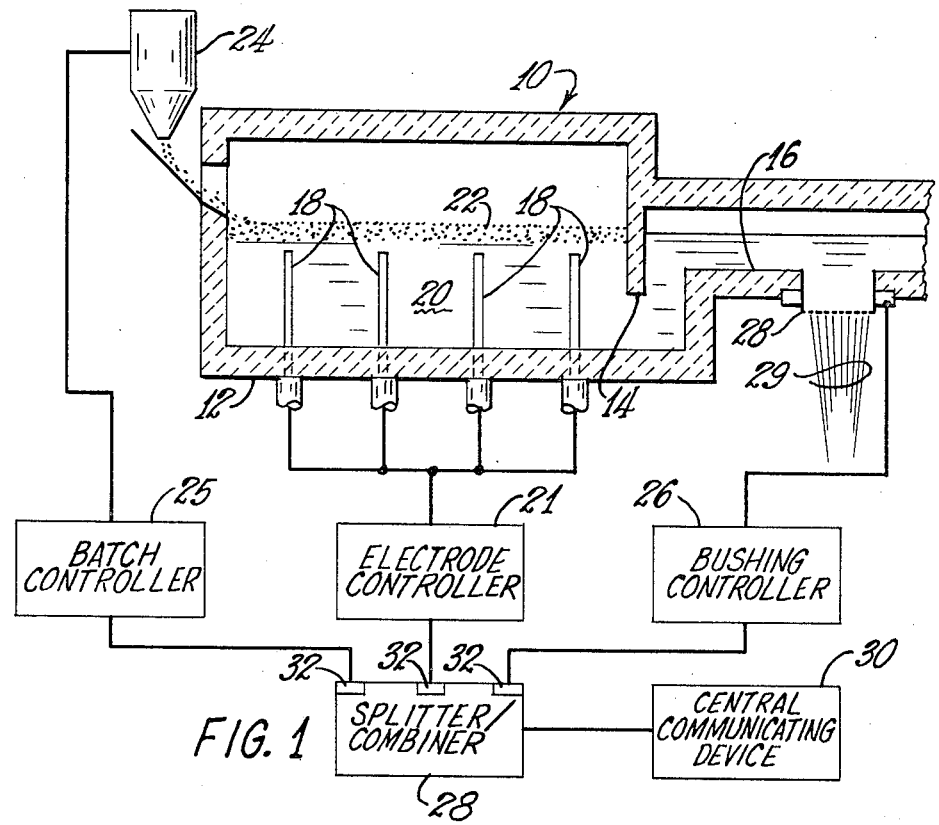
FIG. 1 is a partial schematic view in longitudinal cross-section of an electrically operated, glass-melting furnace utilizing the present invention in a control system requiring multipoint communications.

Referring to FIG. 1, a typical glass-melting furnace utilizing the present invention is indicated generally at numeral 10. Furnace 10 has a melting tank 12 from which glass is discharged past a skimmer block 14 to a discharge passage or forehearth 16. A plurality of electrodes 18 extend upwardly through the bottom of melting tank 12, such electrodes being suitably positioned throughout tank 12 in a desired pattern, as is well known in the electrical furnace art. Controller 21 controls the amount of power supplied to electrodes 18 as a function of the temperature in tank 12 which may be sensed by a suitably positioned thermocouple (not shown). The glass in tank 12 is melted by current flowing between electrodes 18 to form a pool 20 of molten glass.

A suitable supply means 24 provides batch material to furnace 10 with the rate of feed being controlled by controller 25, which may be, for example, an ultrasonic batch level control system as disclosed in U.S. Pat. No. 4,194,077. The layer or crust 22 of batch material on the surface 23 of pool 20 replenishes the molten glass that flows outwardly through forehearth 16. The molten glass of pool 20 flows under skimmer block 14 and along forehearth 16 to glass fiber production means, such as electrically heated fiber forming bushing 28, from which glass fibers 29 are attenuated, as is known in the art. Controller 26 controls the power provided to bushing 28, as a function of the temperature detected by a thermocouple (not shown) in the bushing.

Controllers 21, 25 and 26, which may be microcomputers, are connected to splitter/combiner 28 by current loops for serial communications between such controllers and central communicating device 30, which may be a controller, computer, or monitoring or recording device. Splitter/combiner 28 performs a logical "OR" function for the communication lines. The communication line control circuitry of the present invention, which is shown generally by numeral 32, is associated with each of the lines in the distributed system and may be conveniently located in the same enclosure as splitter/combiner 28. Any number of controllers and splitter/combiners may be employed to control various aspects of the process. In addition, the central communicating device may also be associated with other central communicating devices. The protocol for the system shown in FIG. 1 requires that only one controller may be communicating at a time, that each set of data signals consists of a predetermined number of bits and starts with a low bit and ends with a high bit, and that each controller provides a constant high bit to the line when it is not transmitting data signals. However, it should be understood that the protocol described herein is exemplary and not limiting, in that the subject invention may be utilized in a system in which the protocol requires that the idle state be indicated by a low signal and the start of transmission by a high signal.

Figure 2:
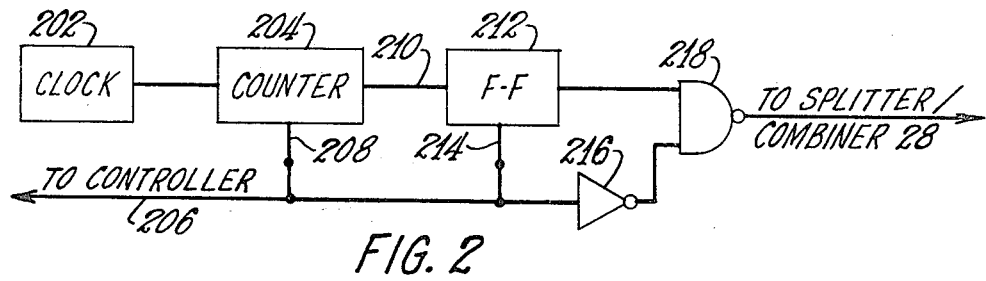
FIG. 2 is a schematic block diagram showing the details of a communication line control system according to the present invention.

FIG. 2 shows one embodiment for implementing the communication line control system of the present invention. A clock 202 provides clock pulses to a counter 204 which is enabled to start counting when data line 206 from, e.g., controller 21 provides a start bit, i.e., a low signal, to terminal 208 of counter 204. Counter 204 provides a low signal on line 210 to a flip-flop 212 which, in turn, provides a high signal to NAND gate 218. When counter 204 has counted a predetermined number of pulses, it provides a high signal on line 210 to set flip-flop 212. Counter 204 is reset by a high signal on line 206 which may be either a data bit or the stop bit. If counter 204 is reset by a high data bit, the transmission of a low data bit thereafter will enable clock 204 to start counting. Data line 206 is also connected to a reset terminal 214 of flip-flop 212 and to the input terminal of an inverter 216. The outputs of flip-flop 212 and inverter 216 are connected to the input terminals of NAND gate 218, which, in turn, provides its output to splitter/combiner 28.

Figure 3:
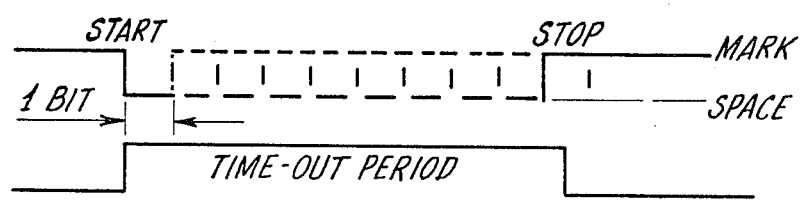
FIG. 3 is a diagrammatic view showing the relationship between the data signals and the time out period of the communication line control system disclosed in FIG. 2.

Referring to FIG. 3, an exemplary character of ten bits is shown as having one start, one stop and eight data bits. The word begins with the falling edge of the start bit and returns to a mark at the beginning of the tenth bit, i.e., nine bit periods after the starting edge, to produce a valid stop bit. The timing period of counter 204 is started coincident with the beginning of the start bit and runs for nine and one-half bits, which is one-half bit longer than the character being transmitted by the controller. The timing period may be any period that is longer than the amount of time required for transmitting the character; however, the timing period should be made as short as possible so that a malfunction in a line or the device associated therewith disturbs a minimum number of characters in the system's communications. The pulse rate provided by clock 202 is chosen so that for the number of bits in the data word and the baud rate used, counter 204 times out at a predetermined point after the beginning of the start bit, such point being during the stop bit interval.

For the embodiment shown in FIG. 2, counter 204 would time out one-half bit later than the data word only if all of the data bits are low signals. If one or more of the data bits are high signals, counter 204 is reset and starts counting its nine and ½ bit period when the next low data bit is transmitted. Therefore, counter 204 may be reset one or more times during the transmission of the data word and thus time out at a point later than the midpoint of the stop bit if it is not reset by the stop bit. If desired, but not preferred, counter 204 may be modified so that it is reset only by the stop bit.

When one of the controllers, for example, controller 21, transmits a character, the start bit enables counter 204 to start counting the pulses from the clock 202. Flip-flop 212 provides a high signal on its output to enable NAND gate 218 to pass the data signals to splitter/combiner 28. Any data bit which consists of a high signal will reset counter 204. When a data bit consisting of a low signal is transmitted, counter 204 will again start measuring the predetermined period of time. If the data line is sound and the transmission is normal, the stop bit will reset counter 204 before it reaches the end of the time out period. Therefore, flip-flop 212 would continue to provide a high signal to NAND gate 218, and the high signal from controller 21 would be inverted by inverter 216 to provide a low signal on the other input to NAND gate 218 thereby insuring that the output of the gate is high to indicate an idle state.

If controller 21 malfunctioned or a break occurred in data line 206 when controller 21 was in its idle state, the low signal created by the malfunction or break would enable counter 204 to start measuring its predetermined period of time. When counter 204 times out it sets flip-flop 212 so that it provides a low signal to one input of NAND gate 218. The low signal on line 206 is inverted by inverter 216 to provide a high signal to the other input of NAND gate 218 which, in turn, provides an idle signal to splitter/combiner 28. Similarly, if the malfunction or break occurred during the transmission of a character, counter 204 would time out and set flip-flop latch 212 to insure that a high signal is provided to splitter/combiner 28. When a malfunction or break has occurred, NAND gate 218 will continue to provide a high signal to splitter/combiner 28 until the problem is repaired and a high signal is provided to reset counter 204 and flip-flop 212.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

We claim:

1. In a communication system having a communication line with a plurality of ports to which electronic means are attached for transmitting and receiving sets of signals, said sets of signals comprising combinations of a first signal having a first magnitude and a second signal having a second magnitude, said second magnitude being different than said first magnitude, and said sets of signals being of a predetermined total number of said first and second signals and always starting with a second signal and ending with a first signal, each of said plurality of electronic means being adapted to provide a first signal when it is not transmitting a set of signals, a method of detecting a malfunction in a first electronic means associated with a first port of said plurality of ports and preventing said first electronic means from interfering with the operation of the remainder of the system when such malfunction occurs, said method comprising the steps of: starting the timing of a predetermined period of time when said first electronic means transmits a second signal after a first signal; resetting the time period when said first electronic means transmits a first signal; inhibiting the transmission of signals transmitted by said first electronic means to said communication line if said predetermined period of time has elapsed; and providing a first signal to said communication line if said predetermined period of time has elapsed.

2. A method as recited in claim 1, wherein said method further comprises the step of providing the signals transmitted by said first electronic means to said communication line after said predetermined period of time has elapsed if said first electronic means transmits a first signal.

3. A method as recited in claim 1, wherein the magnitude of said first signal is greater than the magnitude of said second signal.

4. An apparatus for use with a communication system having a communication line with a plurality of ports to which electronic means are attached for transmitting and receiving sets of signals, said sets comprising combinations of a first signal having a first magnitude and second signal having a second magnitude, a second magnitude being different than a first magnitude, and said sets being of a predetermined total number of said first and second signals and always starting with a second signal and ending with a first signal, each of said plurality of electronic means being adapted to provide a first signal when it is not transmitting a set of signals, said apparatus being associated with a first port of said plurality of ports to detect a malfunction in a first electronic means associated with said first port and to prevent said first electronic means from interfering with the operation of the remainder of the system when such malfunction occurs, said apparatus comprising: timing means for determining when a predetermined period of time has elapsed, said timing means being adapted to start its timing sequence when said first electronic means transmits a second signal after a first signal, said timing means being reset by the transmission of a first signal; and first means responsive to said timing means for providing the signals transmitted by said first electronic means to said communications line, said first means being adapted to inhibit the transmission of signals transmitted by said first electronic means and to provide only a first signal to said communications line if said predetermined period of time has elapsed.

5. An apparatus as recited in claim 4, wherein said predetermined time period is longer than the amount of time required to transmit a set of said signals.

6. An apparatus as recited in claim 5, wherein said first means is adapted to be reset to provide the signals transmitted by said first electronic means to said communication line when said first electronic means provides said first signal.

7. An apparatus as recited in claim 6, wherein said first means comprises a flip-flop responsive to said timing means; an inverter connected to said first electronic means to receive said sets of signals; and a NAND-gate having the output of said inverter and the output of said flip-flop as its input and having its output connected to said first port to provide said sets of signals to said communication line.

8. An apparatus as recited in claims 4 or 7, wherein the magnitude of said first signal is greater than the magnitude of said second signal.

9. A glass fiber producing apparatus comprising: means for producing molten glass fibers; a plurality of electronic means for controlling and monitoring said producing means, said electronic means being connected to a central electronic means by a communication line and being adapted to transmit and receive sets of signals, said sets of signals comprising combinations of a first signal having a first magnitude and second signal having a second magnitude, said second magnitude being different than said first magnitude, and said sets being of a predetermined total number of said first and second signals and always starting with a second signal and ending with a first signal, each of said electronic means being adapted to provide a first signal when it is not transmitting a set of signals; first means associated with a first electronic means of said plurality of electronic means for detecting a malfunction in said first electronic means and for preventing said first electronic means from interfering with the operation of the other electronic means when such malfunction occurs, said first means comprising: timing means for determining when a predetermined period of time has elapsed, said timing means being adapted to start its timing sequence when said first electronic means transmits a second signal after a first signal, said timing means being reset by the transmission of a first signal; and first means responsive to said timing means for providing the signals transmitted by said first electronic means to said communication line, said first means being adapted to inhibit the transmission of signals transmitted by said first electronic means and to provide only a first signal to said communication line if said predetermined period of time has elapsed.

10. An apparatus as recited in claim 9, wherein the magnitude of said first signal is greater than the magnitude of said second signal.

* * * * *